United States Patent
Al Abdulghani et al.

(10) Patent No.: US 12,049,965 B2
(45) Date of Patent: Jul. 30, 2024

(54) SUB-SURFACE SAFETY VALVE (SSSV) ADVISORY SYSTEM-AUTONOMOUS SSSV TROUBLESHOOTING DEVICE

(71) Applicant: SAUDI ARABIAN OIL COMPANY, Dhahran (SA)

(72) Inventors: Ahmed Jassim Al Abdulghani, Qatif (SA); Husain Al Muailu, Qatif (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 261 days.

(21) Appl. No.: 17/455,315

(22) Filed: Nov. 17, 2021

(65) Prior Publication Data

US 2023/0151906 A1    May 18, 2023

(51) Int. Cl.
*F16K 37/00*    (2006.01)
*E21B 34/06*    (2006.01)
*E21B 41/00*    (2006.01)

(52) U.S. Cl.
CPC .......... *F16K 37/0083* (2013.01); *E21B 34/06* (2013.01); *E21B 41/0021* (2013.01)

(58) Field of Classification Search
CPC .......... E21B 34/06; E21B 34/14; E21B 43/12; E21B 41/0021; E21B 2200/05; E21B 34/08; E21B 34/10; E21B 34/16; F16K 37/0083
See application file for complete search history.

(56) References Cited

U.S. PATENT DOCUMENTS

| | | | |
|---|---|---|---|
| 6,055,213 A | 4/2000 | Rubbo et al. | |
| 6,199,629 B1 * | 3/2001 | Shirk | E21B 34/06 166/66.4 |
| 6,880,641 B2 | 4/2005 | Dennistoun et al. | |
| 7,165,619 B2 | 1/2007 | Fox et al. | |
| 8,056,637 B2 | 11/2011 | Larnach | |
| 8,302,686 B2 | 11/2012 | Roddy et al. | |
| 8,857,522 B2 | 10/2014 | Arrazola et al. | |

(Continued)

FOREIGN PATENT DOCUMENTS

| | | |
|---|---|---|
| CN | 109630060 A | 4/2019 |
| WO | 2008/074995 A1 | 6/2008 |

OTHER PUBLICATIONS

Ehtesham, Muhammad Asif et al., "Remote-Activation Safety Valves and Coiled Tubing, Jointed-Tubing Hybrid String: A Novel Well-Intervention Technology"; Proceedings of the International Petroleum Technology Conference; Paper No. IPTC-15076-MS; pp. 1-8; Nov. 15-17, 2011 (8 pages).

(Continued)

*Primary Examiner* — Yong-Suk (Philip) Ro
(74) *Attorney, Agent, or Firm* — Osha Bergman Watanabe & Burton LLP

(57) ABSTRACT

A sub-surface safety valve (SSSV) advisory system is disclosed. The SSSV advisory system includes a memory and a computer processor connected to the memory and that generates at least one control signal to perform an open and close sequence for testing a SSSV in a well environment, measures, during the open and close sequence of the SSSV, an open and close sequence signature of the SSSV, compares the measured open and close sequence signature to a normal open and close sequence signature of the SSSV to generate a comparison result, and generates, based on the comparison result, an integrity measure of the SSSV.

11 Claims, 4 Drawing Sheets

(56) References Cited

U.S. PATENT DOCUMENTS

| | | |
|---|---|---|
| 9,359,859 B2 | 6/2016 | Ross et al. |
| 9,797,240 B2 | 10/2017 | Tunget |
| 10,012,032 B2 | 7/2018 | Yeh et al. |
| 2010/0025045 A1 | 2/2010 | Lake et al. |
| 2012/0031494 A1 | 2/2012 | Lymberopoulos |
| 2021/0231822 A1 | 7/2021 | Wang et al. |

OTHER PUBLICATIONS

Fahim, Mohamed et al., "Innovative Methodology to Riglessly Restore the Functionality of the Sub-Surface safety valves Sc-SSSV with Damaged Control Line"; Proceedings of the SPE Middle East Oil and Gas Show; Paper No. SPE-164370-MS; pp. 1-6; Mar. 10-13, 2013 (6 pages).

* cited by examiner

SUB-SURFACE SAFETY VALVE (SSSV) ADVISORY SYSTEM-AUTONOMOUS SSSV TROUBLESHOOTING DEVICE

BACKGROUND

In the oil and gas industry, safety valves are designed to automatically shut in the flow of a well in the event when surface controls fail or surface equipment becomes damaged. Safety valves are classified as surface or subsurface according to their locations. Sub-surface safety valves (SSSVs) are used as a primary isolation barrier for hydrocarbon production and may also be used as an isolation barrier when installing components in or performing maintenance on the wellhead.

SSSVs are frequently tested and this test typically done manually by an operator at the wellsite. Such testing requires a pressure gauge to be temporarily installed above the crown valve by the operator to measure shut-in wellhead pressure (SIWHP). Manual wellhead integrity and SSSV tests require a large amount of manpower, time, effort and cost, and affect the efficiency of other production activities. SSSVs can be found holding pressure, passing, stuck open, stuck closed, or partially open or closed. If SSSV found not holding pressure, a troubleshooting is required to investigate the situation. Operators often cannot conduct the wellhead integrity and SSSV tests under certain conditions due to bad weather or limited resources. The testing also requires bleeding equipment and other procedures inherent with operational risks to the operator due to presence of $H_2S$. Moreover, troubleshooting might require several visits by the SSSV provider to confirm the SSSV status and provide the recommended remedial actions.

SUMMARY

In general, in one aspect, the invention relates to a sub-surface safety valve (SSSV) advisory system that includes a memory and a computer processor connected to the memory and that generates at least one control signal to perform an open and close sequence for testing a SSSV in a well environment, measures, during the open and close sequence of the SSSV, an open and close sequence signature of the SSSV, compares the measured open and close sequence signature to a normal open and close sequence signature of the SSSV to generate a comparison result, and generates, based on the comparison result, an integrity measure of the SSSV.

In general, in one aspect, the invention relates to a well environment that includes a wellhead, a wellbore, a sub-surface safety valve (SSSV) that isolates the wellhead from the wellbore during a well failure, and an SSSV advisory system that generates at least one control signal to perform an open and close sequence for testing the SSSV in the well sub-surface system, measures, during the open and close sequence of the SSSV, an open and close sequence signature of the SSSV, compares the measured open and close sequence signature to a normal open and close sequence signature of the SSSV to generate a comparison result, and generates, based on the comparison result, an integrity measure of the SSSV.

In general, in one aspect, the invention relates to a method for testing integrity of a sub-surface safety valve (SSSV) in a well environment. The method includes generating at least one control signal to perform an open and close sequence for testing the SSSV in the well environment, measuring, during the open and close sequence of the SSSV, an open and close sequence signature of the SSSV, comparing the measured open and close sequence signature to a normal open and close sequence signature of the SSSV to generate a comparison result, and generating, based on the comparison result, an integrity measure of the SSSV.

Other aspects and advantages will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
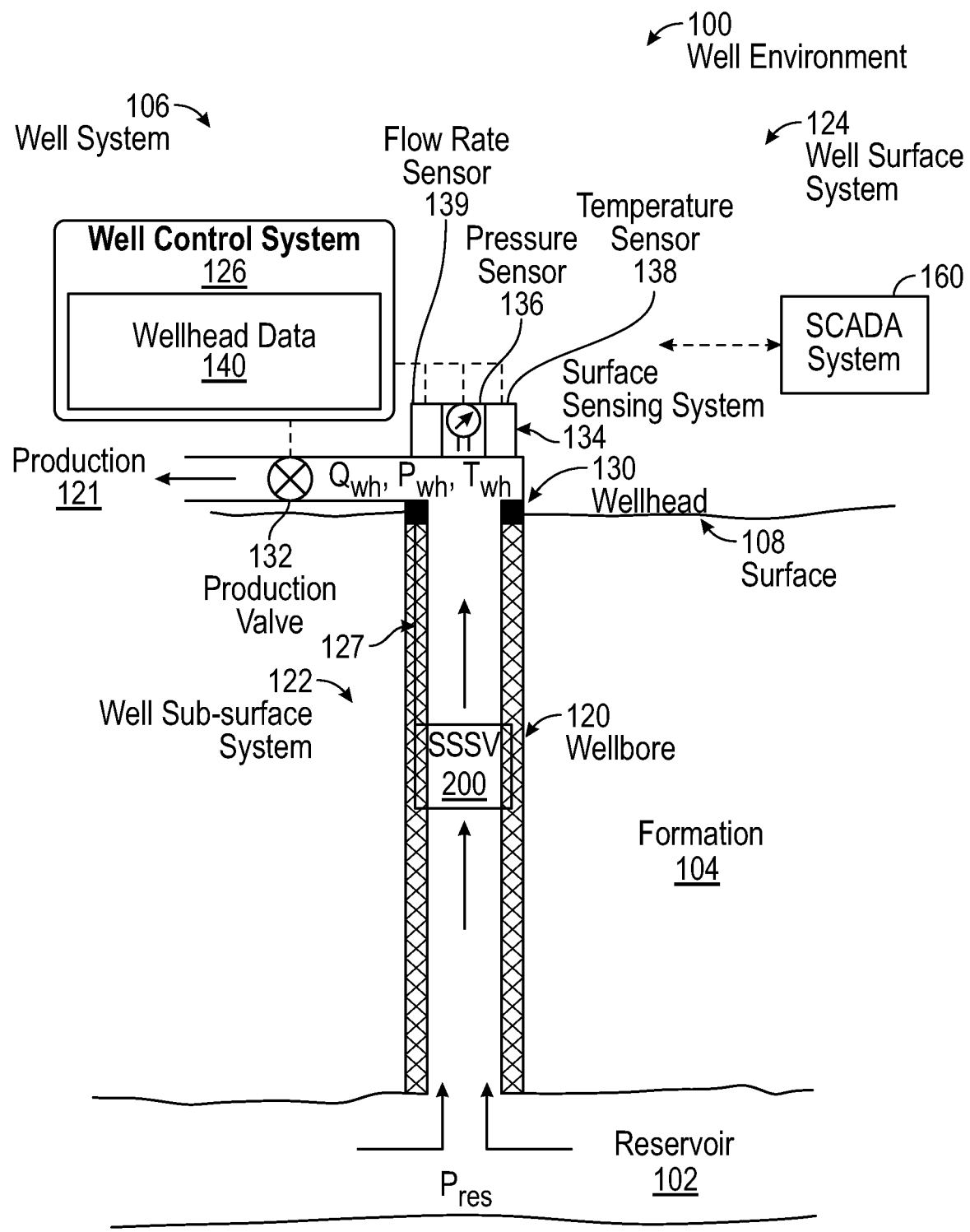
FIGS. 1 and 2 show systems in accordance with one or more embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments of the invention provide a SSSV advisory system, which is a portable device to perform monitoring and troubleshooting procedures of the SSSV. In one or more embodiments of the invention, the SSSV advisory system provides a confirmation of the status of the SSSV based on a corresponding design-specific pressure signature. The SSSV advisory system includes a digital built-in computer that determines whether the SSSV is functioning properly or requires workover, and then administers a rectification procedure if required.

FIG. 1 shows a schematic diagram in accordance with one or more embodiments. More specifically, FIG. 1 illustrates a well environment (100) that includes a hydrocarbon reservoir ("reservoir") (102) located in a subsurface formation ("formation") (104) and a well system (106). The formation (104) may include a porous formation that resides underground, beneath the Earth's surface ("surface") (108). In the case of the well system (106) being a hydrocarbon well, the reservoir (102) may include a portion of the formation (104). The formation (104) and the reservoir (102) may include different layers of rock having varying characteristics, such as varying degrees of permeability, porosity, capillary pressure, and resistivity. In the case of the well system (106) being operated as a production well, the well system (106) may facilitate the extraction of hydrocarbons (or "production") from the reservoir (102).

In some embodiments, the well system (106) includes a wellbore (120), a well sub-surface system (122), a well surface system (124), and a well control system ("control system") (126). The control system (126) may control various operations of the well system (106), such as well production operations, well completion operations, well maintenance operations, and reservoir monitoring, assessment and development operations. In some embodiments, the control system (126) includes a computer system that is the same as or similar to that of computer system (402) described below in FIG. 4 and the accompanying description.

The wellbore (120) may include a bored hole that extends from the surface (108) into a target zone of the formation (104), such as the reservoir (102). An upper end of the wellbore (120), terminating at or near the surface (108), may be referred to as the "up-hole" end of the wellbore (120), and a lower end of the wellbore, terminating in the formation (104), may be referred to as the "down-hole" end of the wellbore (120). The wellbore (120) may facilitate the circulation of drilling fluids during drilling operations, the flow of hydrocarbon production ("production") (121) (e.g., oil and gas) from the reservoir (102) to the surface (108) during production operations, the injection of substances (e.g., water) into the formation (104) or the reservoir (102) during injection operations, or the communication of monitoring devices (e.g., logging tools) into the formation (104) or the reservoir (102) during monitoring operations (e.g., during in situ logging operations). A sub-surface safety valves (SSSVs) (200) may be disposed in the wellbore (120) as a primary isolation barrier for hydrocarbon production and may also be used as an isolation barrier when installing components in or performing maintenance on the wellhead (130).

In some embodiments, during operation of the well system (106), the control system (126) collects and records wellhead data (140) for the well system (106). The wellhead data (140) may include, for example, a record of measurements of wellhead pressure ($P_{wh}$) (e.g., including flowing wellhead pressure), wellhead temperature ($T_{wh}$) (e.g., including flowing wellhead temperature), wellhead production rate ($Q_{wh}$) over some or all of the life of the well (106), and water cut data. In some embodiments, the measurements are recorded in real-time, and are available for review or use within seconds, minutes, or hours of the condition being sensed (e.g., the measurements are available within 1 hour of the condition being sensed). In such an embodiment, the wellhead data (140) may be referred to as "real-time" wellhead data (140). Real-time wellhead data (140) may enable an operator of the well (106) to assess a relatively current state of the well system (106), and make real-time decisions regarding development of the well system (106) and the reservoir (102), such as on-demand adjustments in regulation of production flow from the well. Further, the control system (126) may control the SSSV (200) via a control line (127), e.g., a hydraulic control line.

In some embodiments, the well sub-surface system (122) includes casing installed in the wellbore (120). For example, the wellbore (120) may have a cased portion and an uncased (or "open-hole") portion. The cased portion may include a portion of the wellbore having casing (e.g., casing pipe and casing cement) disposed therein. The uncased portion may include a portion of the wellbore not having casing disposed therein. In embodiments having a casing, the casing defines a central passage that provides a conduit for the transport of tools and substances through the wellbore (120). For example, the central passage may provide a conduit for lowering logging tools into the wellbore (120), a conduit for the flow of production (121) (e.g., oil and gas) from the reservoir (102) to the surface (108), or a conduit for the flow of injection substances (e.g., water) from the surface (108) into the formation (104). In some embodiments, the well sub-surface system (122) includes production tubing installed in the wellbore (120). The production tubing may provide a conduit for the transport of tools and substances through the wellbore (120). The production tubing may, for example, be disposed inside casing. In such an embodiment, the production tubing may provide a conduit for some or all of the production (121) (e.g., oil and gas) passing through the wellbore (120) and the casing.

In some embodiments, the well surface system (124) includes a wellhead (130). The wellhead (130) may include a rigid structure installed at the "up-hole" end of the wellbore (120), at or near where the wellbore (120) terminates at the Earth's surface (108). The wellhead (130) may include structures (called "wellhead casing hanger" for casing and "tubing hanger" for production tubing) for supporting (or "hanging") casing and production tubing extending into the wellbore (120). Production (121) may flow through the wellhead (130), after exiting the wellbore (120) and the well sub-surface system (122), including, for example, the casing and the production tubing. In some embodiments, the well surface system (124) includes flow regulating devices that are operable to control the flow of substances into and out of the wellbore (120). For example, the well surface system (124) may include one or more production valves (132) that are operable to control the flow of production (121). For example, a production valve (132) may be fully opened to enable unrestricted flow of production (121) from the wellbore (120), the production valve (132) may be partially opened to partially restrict (or "throttle") the flow of production (121) from the wellbore (120), and production valve (132) may be fully closed to fully restrict (or "block") the flow of production (121) from the wellbore (120), and through the well surface system (124).

In some embodiments, the wellhead (130) includes a choke assembly. For example, the choke assembly may include hardware with functionality for opening and closing the fluid flow through pipes in the well system (106). Likewise, the choke assembly may include a pipe manifold that may lower the pressure of fluid traversing the wellhead. As such, the choke assembly may include set of high pressure valves and at least two chokes. These chokes may be fixed or adjustable or a mix of both. Redundancy may be provided so that if one choke has to be taken out of service, the flow can be directed through another choke. In some embodiments, pressure valves and chokes are communicatively coupled to the well control system (126). Accordingly, a well control system (126) may obtain wellhead data regarding the choke assembly as well as transmit one or more commands to components within the choke assembly in order to adjust one or more choke assembly parameters.

Keeping with FIG. 1, in some embodiments, the well surface system (124) includes a surface sensing system (134). The surface sensing system (134) may include sensors for sensing characteristics of substances, including production (121), passing through or otherwise located in the well surface system (124). The characteristics may include, for example, pressure, temperature and flow rate of production (121) flowing through the wellhead (130), or other conduits of the well surface system (124), after exiting the wellbore (120).

In some embodiments, the surface sensing system (134) includes a surface pressure sensor (136) operable to sense the pressure of production (121) flowing through the well surface system (124), after it exits the wellbore (120). The surface pressure sensor (136) may include, for example, a wellhead pressure sensor that senses a pressure of production (121) flowing through or otherwise located in the wellhead (130). In some embodiments, the surface sensing system (134) includes a surface temperature sensor (138) operable to sense the temperature of production (121) flowing through the well surface system (124), after it exits the wellbore (120). The surface temperature sensor (138) may include, for example, a wellhead temperature sensor that senses a temperature of production (121) flowing through or otherwise located in the wellhead (130), referred to as "wellhead temperature" ($T_{wh}$). In some embodiments, the surface sensing system (134) includes a flow rate sensor (139) operable to sense the flow rate of production (121) flowing through the well surface system (124), after it exits the wellbore (120). The flow rate sensor (139) may include hardware that senses a flow rate of production (121) ($Q_{wh}$) passing through the wellhead (130).

In some embodiments, the well system (106) communicates with the supervisory control and data acquisition (SCADA) system (160) using wired and/or wireless data communication networks. The SCADA system (160) is a control system of computers, networked data communications and graphical user interfaces for gathering and analyzing real time data, such as the wellhead data (140) and other data collected by the well system (106), in particular the well control system (126). Specifically, the SCADA system (160) is used to monitor and control the well system (106). For example, various hydraulic valves, such as the production valve (132) and/or other surface/sub-surface valves of the well system (106), are remotely controlled using the SCADA system (160). In particular, each hydraulic valve can be closed and/or opened in response to a control signal sent from, or otherwise activated by the SCADA system (160). In one or more embodiments of the invention, the SCADA system (160) is implemented based on the computing system (400) described in reference to FIG. 4 below.

Figure 2:
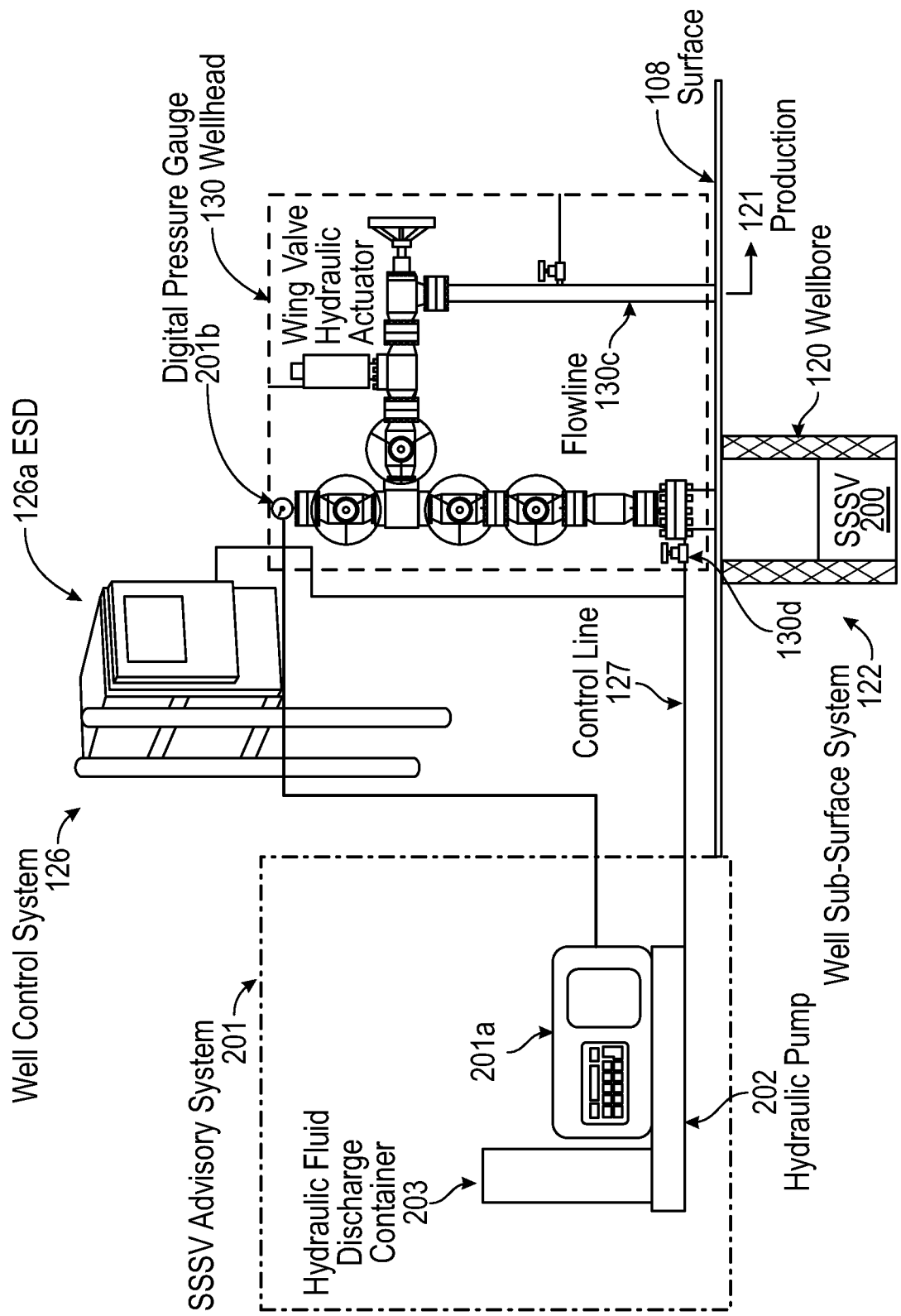

Turning to FIG. 2, FIG. 2 shows a schematic diagram in accordance with one or more embodiments. In one or more embodiments, one or more of the modules and/or elements shown in FIG. 2 may be omitted, repeated, and/or substituted. Accordingly, embodiments of the invention should not be considered limited to the specific arrangements of modules and/or elements shown in FIG. 2.

FIG. 2 illustrates details of the wellhead (130), well sub-surface system (122), and well control system (126) depicted in FIG. 1 above. As shown in FIG. 2, the wellhead (130) includes a well cap with a digital pressure gauge (200), a flowline (130c), and various wellhead valves, such as one or more of a crown valve, a wing valve, a surface safety valve (SSV), a master valve, a choke valve, a block limit valve, etc. The well cap provides access to wellbore for interventions with wireline, coil tubing, slick line etc. The flowline (130c) connects from the wellhead (130) to deliver the production (121) depicted in FIG. 1 above to a processing facility. The crown valve is the upper most valve on wellhead. Typically, the crown valve is closed until there is a need to access the well. The wing valve is for production flow control. In the case of needing to enter a well, this valve would be closed and the master valve would be open. The surface safety valve is typically a hydraulic failsafe close valve located at surface. The surface safety valve is used in the event of an issue in the wellbore/surface equipment and for testing. The master valve is the main valve controlling flow from the wellbore. The choke valve is used for flow restriction in the event of bleeding down pressure during testing, loss of pressure in the wellbore, temperature management, etc. The block limit valve is a valve for testing, maintenance and isolation purposes, e.g., if any wellhead components were being replaced.

Further as shown in FIG. 2, the well sub-surface system (122) includes a SSSV (200) between the wellhead (130) and the wellbore (120), among other sub-surface components not explicitly shown. The SSSV (200) is a safety device located below the surface, e.g., several hundred plus feet below the surface (108). The SSSV (200) is part of the production tubing and is a means for safety closure in the case of uncontrolled release of hydrocarbons, such as a kick. Also, the SSSV (200) may be used as a barrier when testing or needed to perform maintenance on the wellhead (130).

In one or more embodiments, the wellhead valves and flowline (130c) of the wellhead (130), as well as the SSSV (200) of the well sub-surface system (122) are monitored and controlled by the well control system (126). As explicitly shown in FIG. 2, the SSSV (200) is controlled, via a control line (127b) and a needle valve (130d), by an emergency shutdown system (ESD) (126a) of the well control system (126). The needle valve (130d) may be a surface controlled needle valve referred to as the surface controlled SSSV (SCSSSV) needle valve. The control line (127b) may be a hydraulic line referred to as the surface controlled SSSV (SCSSSV) hydraulic line. For example, the ESD (126a) may monitor the fluid pressure in the flowline (130c) using the pressure sensor (136) depicted in FIG. 1 above. The ESD (126a) may shut down the sub-surface valves (e.g., SSSV (200)) based on the monitored pressure conditions. In normal conditions, the SSSV (200) is controlled from the ESD (126a) at a certain pressure to keep the SSSV (200) open under flowing conditions. However, in case of routine check or troubleshooting, the SCSSV needle valve (130d) is closed and a portable manual hydraulic pump (202) is brought to the wellsite and connected. The SCSSSV needle valve (130d) is then opened and a maintenance procedure is performed to check the integrity of the SSSV (200). The hydraulic fluid discharge container (203) receives fluids discharged from the SCSSSV control line (127) after closing the SSSV (200). For example, the maintenance procedure may be based on the flowchart described in reference to FIG. 3 below.

In one or more embodiments, The SSSV advisory system (201) is connected from the SCSSSV needle valve (130d) via the SCSSSV hydraulic line (127b). The SSSV advisory system (201) is a computer operated system and performs troubleshooting of the SSSV (200) using a hydraulic pump (202) and a hydraulic fluid discharge container (203) to perform an open and close sequence of the SSSV (200). For example, the SSSV advisory system (201) generates control signals for controlling the hydraulic pump (202) and measures the hydraulic fluid discharge volume inside the container (203). Further, the SSSV advisory system (201) may include sensors for measuring flow rates and/or fluid volumes to/from the hydraulic pump (202) and the hydraulic fluid discharge container (203). During the open and close sequence, the SSSV advisory system (201) uses a built-in computer processor (201a) with embedded control software to count number of strokes, pressure, and fluid volume pumped to open the SSSV (200). For example, the computer processor (201a) may receive pressure readings from the digital pressure gauge (201b). The stroke count, pressure and pumped fluid volumes throughout the open and close sequence are compared to a normal signature pattern of the SSSV (200). In one or more embodiments, the normal signature pattern is specific to the design of the SSSV (200).

In one or more embodiments, the SSSV advisory system (201) performs the proper troubleshooting procedure based on the SSSV provider, provides a confirmation of the status of the SSSV (200) based on its design, and performs a proper procedure for rectification if required. For example, the SSSV (200) may be a TRSSSV (tubing retrievable SSSV) and can be rectified by performing a wireline operation. In one or more embodiments, the SSSV advisory system (201) performs these functionalities using the method described in reference to FIG. 3 below.

Figure 3:
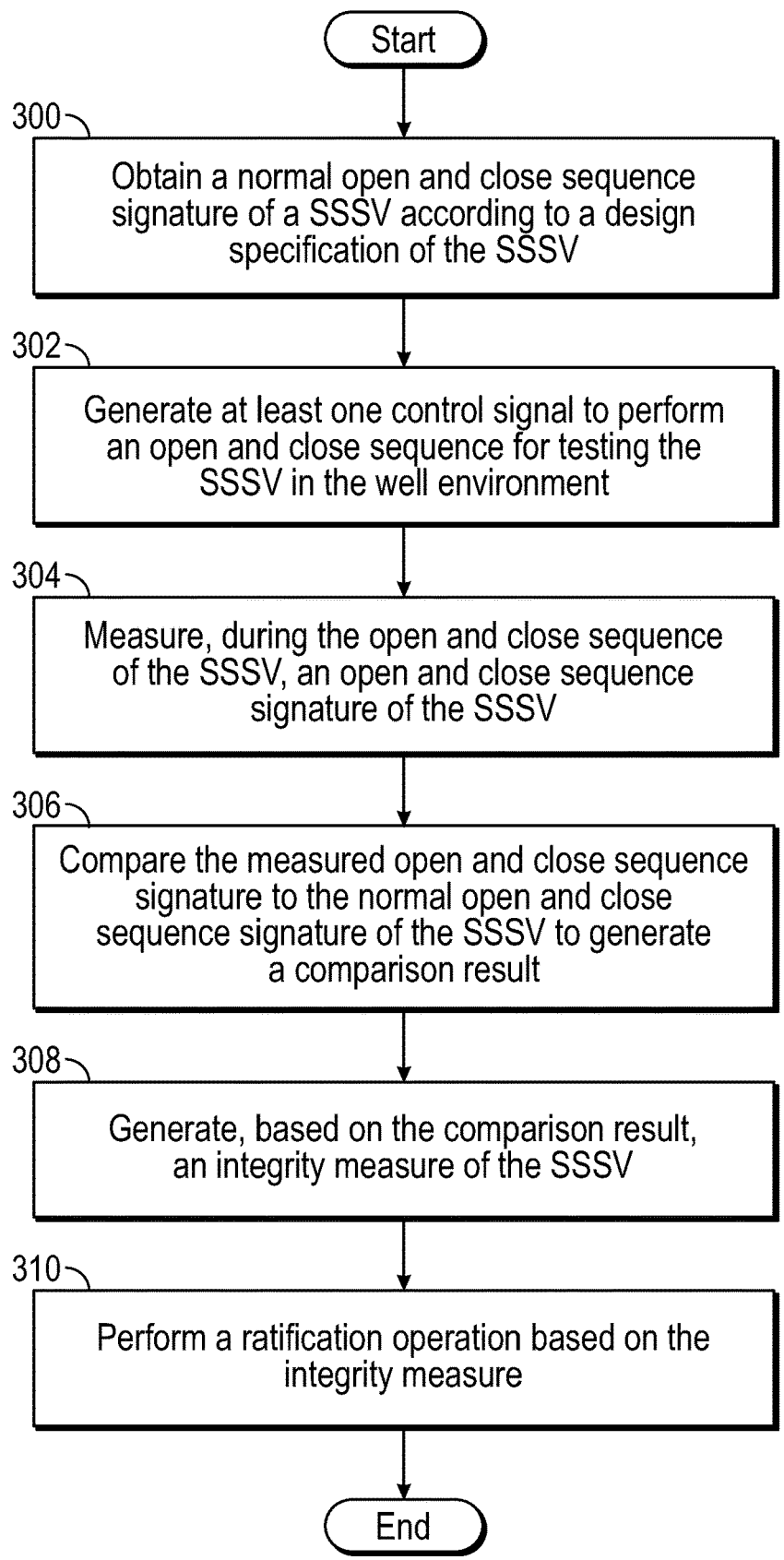
FIG. 3 shows a flowchart in accordance with one or more embodiments.

FIG. 3 shows a flowchart in accordance with one or more embodiments. One or more blocks in FIG. 3 may be performed using one or more components as described in FIGS. 1 and 2. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

While some downhole equipment remains static throughout the life of the wellbore completion, safety valves are routinely opened, closed, and tested to ensure that they are ready and working properly in anticipation of any catastrophe event. However, the safety valves sometimes fail during normal production operations due to several reasons, such as debris accumulation around the valve and control line leak. A safety valve failure generally necessitates many troubleshooting visits and may include at later stages an unscheduled workover which interrupts production and, particularly in offshore environments, can be very expensive. In several scenarios, the SSSV can be returned to functioning status by proper troubleshooting procedures. Moreover, in certain scenario, the safety valve failure may require the installation of an insert safety valve. In one or more embodiments, the method flowchart described below is used to improve or otherwise facilitate field services to maintain the integrity of the SSSV during routine activities.

Initially in Block 300, a normal open and close sequence file signature of a SSSV according to a design specification of the SSSV is obtained and can be benchmarked with the vendor specifications. In one or more embodiments of the invention, the normal open and close sequence signature is recorded when the SSSV is verified to be functioning properly according to the design specification of the SSSV. For example, the normal open and close sequence signature may be recorded when the properly functioning SSSV is initially installed in the well environment. Specifically, during an open and close sequence of the properly functioning SSSV, a stroke count, pressure flickering indication, and a pumped hydraulic fluid volume of the SSSV are recorded as the normal open sequence signature. Measurements may be recorded throughout multiple open and close sequences and analyzed to generate a statistical mean and standard deviation, which collectively form the normal open and close sequence signature. In an alternative embodiment, the normal open and close sequence signature is pre-recorded (e.g., by a manufacture or vendor of the SSSV) prior to the installation of the SSSV in the well environment.

In Block 302, at least one signal function is generated to perform an open and close sequence for testing the SSSV in the well environment. In one or more embodiments of the invention, the at least one control signal is generated periodically, according to a pre-determined testing schedule, in response to a user input, and/or as triggered by a pre-determined event.

In Block 304, during the open and close sequence of the SSSV under test, an open and close sequence signature of the SSSV is measured. For example, the stroke count, pumped fluid volume, pressure flickering indications, and back-flowed fluid volume of the SSSV under test are recorded as the measured open and close sequence signature. Using a hydraulic pump and in response to the at least one control signal, a surface controlled SSSV hydraulic line is stroked to open the SSSV under test during the open and close sequence. When there is no pressure is applied at the control line to the SSSV to operate, the default position for the SSSV is closed. Throughout the open and close sequence, a number of times the hydraulic pump strokes the surface controlled SSSV hydraulic line to cause the SSSV to open is measured and recorded as the stroke count, an amount of fluid pumped through the surface controlled SSSV hydraulic line during the number of times the hydraulic pump strokes the surface controlled SSSV hydraulic line is measured and recorded as the pumped fluid volume, and a fluid volume received by the hydraulic fluid discharge container from the surface controlled SSSV hydraulic line is measured.

In Block 306, the measured open and close sequence signature is compared to the normal open and close sequence signature of the SSSV to generate a comparison result. It is intuitive to know whether the SSSV is later opened or closed if the wellhead pressure changes. For example, the comparison result may include a difference between the normal stroke count and the measured stroke count, a difference between the measured pumped fluid volume and the normal pumped fluid volume, and/or a difference between the measured back-flowed fluid volume and the normal back-flowed fluid volume. The difference may be based on the mean values of the normal open and close sequence signature. Alternatively, the difference may be based on the ranges (i.e., the mean value bracketed by the standard deviations) of the normal open and close sequence signature.

In Block 308, an integrity measure of the SSSV is generated based on the comparison result. In one or more embodiments, the integrity measure may be based on whether the comparison result is within a pre-determined range of stroke count difference, pumped fluid volume, and/or back-flowed fluid volume, or based on how much the comparison result exceeds the pre-determined range. For example, the integrity measure may be either NORMAL indicating that the comparison result is within the pre-determined range or FAILED indicating that the comparison result exceeds the pre-determined range. In other words, the integrity measure "FAILED" indicates that the SSSV has deteriorated or not functioning within the specification. In another example, the integrity measure may be a percentage where 100% functioning properly indicates that the comparison result is within the pre-determined range, and any other percentage less that 100% corresponds to the extent that the comparison result exceeds the pre-determined range. In other words, the integrity measure of any other percentage less than 100% indicates the extent that the SSSV has deteriorated or deviated from the specification.

In Block 310, a rectification operation is performed based on the integrity measure. For example, the SSSV may be repaired, replaced, or otherwise ratified if the integrity measure indicates that the SSSV is not NORMAL or 100% functioning properly.

The method described above allows for automatic remote valve testing and does not require any operator to be on location. The automatic testing increases the operation efficiency, reduces the operational cost, and improves the operation safety without the need for operator visit to the well. The advisory system described above facilitates field services to maintain SSSV integrity during the routine activities. The method and the advisory system may be used by field services, well services, and/or production engineering and the vendor specialist. The vendor refers to a provider or manufacturer of the SSSV. The method and the advisory system include the following advantages: (i) providing a proper procedure to troubleshoot, (ii) confirming the status of the SSSV, (iii) indicating if the SSSV requires workover, and (iv) identifying any urgency to bring the vendor for on-site troubleshoot.

Figure 4:
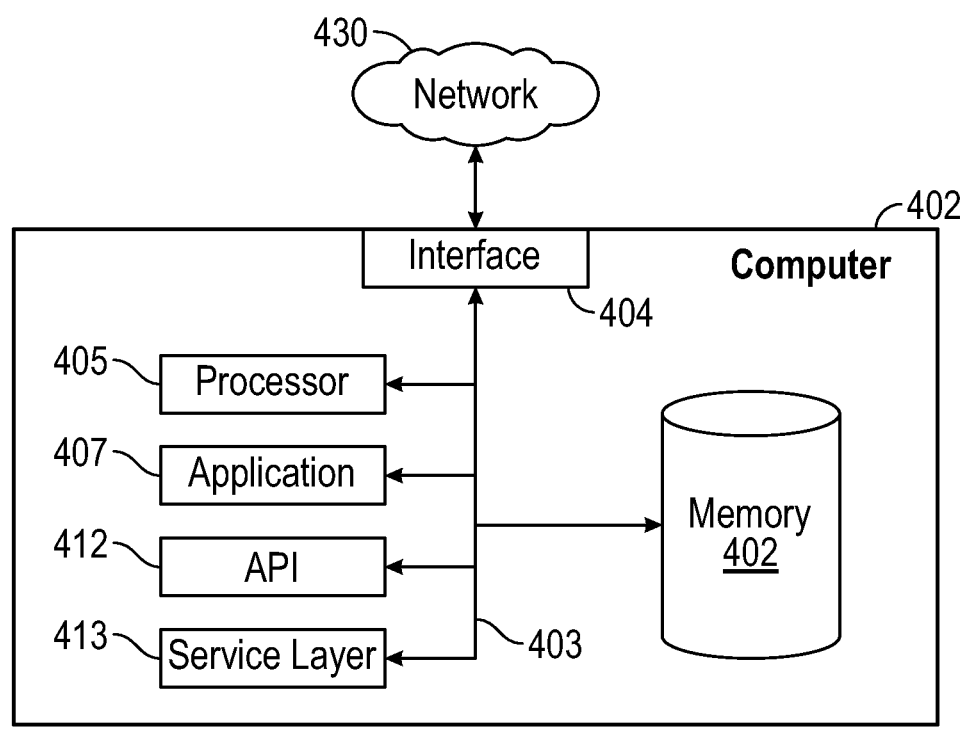
FIG. 4 shows a computing system in accordance with one or more embodiments.

Embodiments may be implemented on a computer system. FIG. 4 is a block diagram of a computer system (402) used to provide computational functionalities associated with described algorithms, methods, functions, processes, flows, and procedures as described in the instant disclosure, according to an implementation. The illustrated computer (402) is intended to encompass any computing device such as a high performance computing (HPC) device, a server, a laptop/notebook computer, wireless data port, smart phone, personal data assistant (PDA), tablet computing device, one or more processors within these devices, or any other suitable processing device, including both physical or virtual instances (or both) of the computing device. Additionally, the computer (402) may include a computer that includes an input device, such as a keypad, keyboard, touch screen, or other device that can accept user information, and an output device that conveys information associated with the operation of the computer (402), including digital data, visual, or audio information (or a combination of information), or a GUI.

The computer (402) can serve in a role as a client, network component, a server, a database or other persistency, or any other component (or a combination of roles) of a computer system for performing the subject matter described in the instant disclosure. The illustrated computer (402) is communicably coupled with a network (530). In some implementations, one or more components of the computer (402) may be configured to operate within environments, including cloud-computing-based, local, global, or other environment (or a combination of environments).

At a high level, the computer (402) is an electronic computing device operable to receive, transmit, process, store, or manage data and information associated with the described subject matter. According to some implementations, the computer (402) may also include or be communicably coupled with an application server, e-mail server, web server, caching server, streaming data server, business intelligence (BI) server, or other server (or a combination of servers).

The computer (402) can receive requests over network (530) from a client application (for example, executing on another computer (402)) and responding to the received requests by processing the said requests in an appropriate software application. In addition, requests may also be sent to the computer (402) from internal users (for example, from a command console or by other appropriate access method), external or third-parties, other automated applications, as well as any other appropriate entities, individuals, systems, or computers.

Each of the components of the computer (402) can communicate using a system bus (403). In some implementations, any or all of the components of the computer (402), both hardware or software (or a combination of hardware and software), may interface with each other or the interface (404) (or a combination of both) over the system bus (403) using an application programming interface (API) (412) or a service layer (413) (or a combination of the API (412) and service layer (413). The API (412) may include specifications for routines, data structures, and object classes. The API (412) may be either computer-language independent or dependent and refer to a complete interface, a single function, or even a set of APIs. The service layer (413) provides software services to the computer (402) or other components (whether or not illustrated) that are communicably coupled to the computer (402). The functionality of the computer (402) may be accessible for all service consumers using this service layer. Software services, such as those provided by the service layer (413), provide reusable, defined business functionalities through a defined interface. For example, the interface may be software written in JAVA, C++, or other suitable language providing data in extensible markup language (XML) format or other suitable format. While illustrated as an integrated component of the computer (402), alternative implementations may illustrate the API (412) or the service layer (413) as stand-alone components in relation to other components of the computer (402) or other components (whether or not illustrated) that are communicably coupled to the computer (402). Moreover, any or all parts of the API (412) or the service layer (413) may be implemented as child or sub-modules of another software module, enterprise application, or hardware module without departing from the scope of this disclosure.

The computer (402) includes an interface (404). Although illustrated as a single interface (404) in FIG. 4, two or more interfaces (404) may be used according to particular needs, desires, or particular implementations of the computer (402). The interface (404) is used by the computer (402) for communicating with other systems in a distributed environment that are connected to the network (430). Generally, the interface (404) includes logic encoded in software or hardware (or a combination of software and hardware) and operable to communicate with the network (430). More specifically, the interface (404) may include software supporting one or more communication protocols associated with communications such that the network (430) or interface's hardware is operable to communicate physical signals within and outside of the illustrated computer (402).

The computer (402) includes at least one computer processor (405). Although illustrated as a single computer processor (405) in FIG. 4, two or more processors may be used according to particular needs, desires, or particular implementations of the computer (402). Generally, the computer processor (405) executes instructions and manipulates data to perform the operations of the computer (402) and any algorithms, methods, functions, processes, flows, and procedures as described in the instant disclosure.

The computer (402) also includes a memory (406) that holds data for the computer (402) or other components (or a combination of both) that can be connected to the network (430). For example, memory (406) can be a database storing data consistent with this disclosure. Although illustrated as a single memory (406) in FIG. 4, two or more memories may be used according to particular needs, desires, or particular implementations of the computer (402) and the described functionality. While memory (406) is illustrated as an integral component of the computer (402), in alternative implementations, memory (406) can be external to the computer (402).

The application (407) is an algorithmic software engine providing functionality according to particular needs, desires, or particular implementations of the computer (402), particularly with respect to functionality described in this disclosure. For example, application (407) can serve as one or more components, modules, applications, etc. Further, although illustrated as a single application (407), the application (407) may be implemented as multiple applications (407) on the computer (402). In addition, although illustrated as integral to the computer (402), in alternative implementations, the application (407) can be external to the computer (402).

There may be any number of computers (402) associated with, or external to, a computer system containing computer (402), each computer (402) communicating over network (430). Further, the term "client," "user," and other appropriate terminology may be used interchangeably as appropriate without departing from the scope of this disclosure. Moreover, this disclosure contemplates that many users may use one computer (402), or that one user may use multiple computers (402).

In some embodiments, the computer (402) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A sub-surface safety valve (SSSV) advisory system, comprising:
    a memory; and
    a computer processor connected to the memory and that:
        generates at least one control signal to perform an open and close sequence for testing a SSSV in a well environment;
        measures, during the open and close sequence of the SSSV, an open and close sequence signature of the SSSV;
        compares the measured open and close sequence signature to a normal open and close sequence signature of the SSSV to generate a comparison result; and
        generates, based on the comparison result, an integrity measure of the SSSV,
        wherein the open and close sequence signature comprises a stroke count, pressure flickering indications, a pumped fluid volume, and a retuned fluid volume of the SSS, and
        wherein the normal open and close sequence signature is recorded when the SSSV is verified to be functioning properly according to a design specification of the SSSV.

2. The SSSV advisory system of claim 1, further comprising:
    a hydraulic pump that strokes, in response to the at least one control signal, a surface controlled SSSV hydraulic line to open the SSSV in the open and close sequence; and
    a hydraulic fluid discharge container that receives the back-flowed fluid volume from the surface controlled SSSV hydraulic line when the SSSV closes in the open and close sequence.

3. The SSSV advisory system of claim 2,
    wherein the stroke count corresponds to a number of times the hydraulic pump strokes the surface controlled SSSV hydraulic line to cause the SSSV to open in the open and close sequence, and
    wherein the pumped fluid volume corresponds to an amount of fluid pumped through the surface controlled SSSV hydraulic line during the number of times the hydraulic pump strokes the surface controlled SSSV hydraulic line.

4. The SSSV advisory system of claim 1, wherein the normal open and close sequence signature of the SSSV is recorded when the SSSV is verified to be functioning properly according to a design specification of the SSSV.

5. The SSSV advisory system of claim 4, wherein the normal open and close sequence signature of the SSSV is recorded when the SSSV is initially installed in the well environment.

6. The SSSV advisory system of claim 1, wherein a rectification operation is performed based on the integrity measure.

7. A method for testing integrity of a sub-surface safety valve (SSSV) in a well environment, the method comprising:
    generating at least one control signal to perform an open and close sequence for testing the SSSV in the well environment;
    measuring, during the open and close sequence of the SSSV, an open and close sequence signature of the SSSV;
    comparing the measured open and close sequence signature to a normal open and close sequence signature of the SSSV to generate a comparison result; and
    generating, based on the comparison result, an integrity measure of the SSSV,
    wherein the open and close sequence signature comprises a stroke count, pressure flickering indications, a pumped fluid volume, and a retuned fluid volume of the SSS, and
    wherein the normal open and close sequence signature is recorded when the SSSV is verified to be functioning properly according to a design specification of the SSSV.

8. The method of claim 7, wherein measuring the open and close sequence signature of the SSSV comprises:
    stroking, using a hydraulic pump and in response to the at least one control signal, a surface controlled SSSV hydraulic line to open the SSSV in the open and close sequence; and receiving, using a hydraulic fluid discharge container, the back-flowed fluid volume from the surface controlled SSSV hydraulic line when the SSSV closes in the open and close sequence.

9. The method of claim 8,
wherein the stroke count corresponds to a number of times the hydraulic pump strokes the surface controlled SSSV hydraulic line to cause the SSSV to open in the open and close sequence, and
wherein the pumped fluid volume corresponds to an amount of fluid pumped through the surface controlled SSSV hydraulic line during the number of times the hydraulic pump strokes the surface controlled SSSV hydraulic line.

10. The method of claim 7, further comprising:
recording the normal open and close sequence signature of the SSSV when the SSSV is verified to be functioning properly according to a design specification of the SSSV.

11. The method of claim 7, further comprising performing a rectification operation based on the integrity measure.

\* \* \* \* \*